Patented Apr. 3, 1945

2,372,670

UNITED STATES PATENT OFFICE 2,372,670

PRODUCTION OF ALKALI METAL HYDRIDE

Virgil L. Hansley, Niagara Falls, N. Y., assignor to E. I. du Pont de Nemours & Company, Wilmington, Del., a corporation of Delaware No Drawing. Application February 15, 1944, Serial No. 522,505

10 Claims. (Cl. 23—204)

This invention relates to the manufacture of alkali metal hydrides.

Freudenberg et al., U. S. P. 1,796,265, describes a process for making alkali metal hydrides in which a solid material substantially inert to alkali metal is mixed with molten alkali and the mixture subjected to the action of hydrogen at a temperature of 180° to 300° C. In the usual practice of this process, the alkali metal hydride is used as the solid material. Thus, to make sodium hydride, a quantity of finely divided sodium hydride is placed in a closed container equipped for stirring, a convenient form being a rotatable cylindrical container. This may be provided with baffles for stirring the solid material, or articles such as iron balls, rods or the like may be included in the charge to assist in stirring when the cylindrical container is rotated on its axis. A quantity of molten sodium is introduced usually in amounts somewhat less than that required to completely wet the surface of the solid hydride and thoroughly mixed with the latter. Then, with continued agitation, hydrogen is passed into the container to convert the metallic sodium to sodium hydride. The sodium may be introduced intermittently or continuously, and generally finished hydride is removed from the reactor intermittently, leaving a suitable amount of hydride in the reactor for succeeding operations.

An object of the present invention is to provide an improved process for the manufacture of alkali metal hydrides by reacting sodium or other alkali metal with hydrogen. A further object is to improve the process of the above-mentioned Freudenberg et al. patent for making sodium hydride and other alkali metal hydrides. Another object is to increase the rate of reaction between hydrogen and an alkali metal in the manufacture of its hydride. Still other objects will be apparent from the following description.

In accordance with the present invention, hydrogen is reacted with an alkali metal according to the method of the Freudenberg et al. patent described above, except that I add to the reaction mixture a small amount of a fatty acid having more than 8 carbon atoms, or a salt of such acid. Examples of such acids are caprylic, capric, stearic, oleic, palmitic, arachidic, pelargonic, myristic, montanic, linoleic, linolinic, palmitolic and stearolic acids. Any metal salts of such acids may be used. Examples of suitable salts of such acids are salts of light or heavy metals, e. g., the alkali metals, the alkaline earth metals, magnesium, aluminum, zinc, copper, iron, tin, mercury, etc. I may also use the ammonium salts and salts of strong organic bases such as the alkyl amines and other aliphatic amines. Herein, and in the appended claims, I use the term "salts" to include the ammonium and amine salts, as well as the metal salts.

It is not essential that the fatty acid or its salt or ester be added in the pure form and, if desired, it may be diluted with other organic materials.

Preferably the amount of the acid or salt added is from about 0.1 to 1 per cent by weight of the charge in the reactor; in any event not more than about 10 per cent by weight. It may be added at any desired stage during the process. It may be mixed with the alkali metal hydride or other solid material utilized prior to the addition of the molten alkali metal or it may be added continuously during the hydrogenation operation.

The following example further illustrates methods of practicing my invention and the results thereby obtained:

Example

A rotary autoclave of approximately one liter capacity was charged with finely divided (50 to 300 mesh) aluminum and a quantity of sodium equal to about one tenth of the weight of the aluminum powder. After displacing the air with nitrogen, the autoclave was heated, while being rotated, to about 100° C. to melt the sodium and thoroughly mix the contents of the autoclave. Hydrogen was then introduced and the temperature was maintained at about 200 to 350° C. No appreciable amount of hydrogen was absorbed by the charge.

In three further runs, the above procedure was followed, except that a small amount of stearic acid and its magnesium and sodium salts was added in the different runs. In these runs there was rapid hydrogen absorption at 200 to 350° C. to form sodium hydride. Periodically, as the unreacted sodium was consumed, further increments of sodium (approximately 10% of the weight of the charge) were added and hydrogenation continued, until a desired amount of hydride was formed. The data and results are tabulated below:

| Activator added | Weight of aluminum powder | Total sodium added | Time for complete conversion of the sodium to hydride |
|---|---|---|---|
| | G. | G. | |
| None | 82 | 46 | Essentially no absorption of $H_2$. |
| Stearic acid 1.8% of total charge. | 116 | 92 | 124 min. |
| Magnesium stearate 1.8% of total charge. | 262 | 207 | 130 min. |
| Sodium stearate 1.9% of total charge. | 174 | 138 | 105 min. |

My process is suitable for making the hydrides of the various alkali metals, i. e., sodium, potassium, lithium, cesium, and rubidium. If desired, mixed hydrides can be made by reacting hydrogen with a mixture of one or more of the alkali metals in accordance with my invention.

While the Freudenberg et al. patent describes a reaction temperature of 180 to 300° C., a wider temperature range may be employed, if desired, in practicing my invention. Thus the reaction will occur at temperatures as low as the melting point of the alkali metal, though somewhat slowly. Temperatures as high as 500 to 600° C. may be employed, provided sufficient hydrogen pressure is employed to prevent undue hydride decomposition. Generally, I prefer to carry out the reaction in the temperature range of 200 to 450° C.

The operation may be carried out substantially at atmospheric pressure or at higher pressures, as desired. Other gases may be introduced with the hydrogen, if desired. Such other gases may be inert diluents or may be reactive gases to produce a mixture of hydride and other alkali metal compound. Generally, I prefer to use substantially pure hydrogen at or slightly above atmospheric pressure.

To start the process, I prefer to use the hydride to be produced as the solid material with which the molten alkali metal is mixed. If necessary, such may be produced by previously known processes, e. g., the process of Muckenfuss, U. S. P. 1,958,012. If desired, other solid materials, preferably those inert to the alkali metal may be used, including those described in the Freudenberg et al. patent and others, e. g., sand, clays, various powdered metals, and various salts which are infusible at the reaction temperature.

I claim:

1. A process for manufacture of alkali metal hydride which comprises mixing a molten alkali metal with a finely divided solid material and a relatively small amount of a fatty acid compound selected from the group consisting of fatty acids having more than 8 carbon atoms and salts thereof and subjecting the mixture to the action of hydrogen.

2. A process for manufacture of sodium hydride which comprises mixing molten sodium with a finely divided solid material and about 0.1 to 1% by weight of magnesium stearate and subjecting the mixture to the action of hydrogen.

3. A process for manufacture of sodium hydride which comprises mixing molten sodium wit ha finely divided solid material and about 0.1 to 1% by weight of stearic acid and subjecting the mixture to the action of hydrogen.

4. A process for manufacture of sodium hydride which comprises mixing molten sodium with finely divided sodium hydride and about 0.1 to 1% by weight of a fatty acid compound selected from the group consisting of fatty acids having more than 8 carbon atoms and salts thereof and subjecting the mixture to the action of hydrogen.

5. A process for manufacture of sodium hydride which comprises mixing molten sodium with finely divided sodium hydride and about 0.1 to 1% by weight of a sodium salt of a fatty acid containing more than 8 carbon atoms and subjecting the mixture to the action of hydrogen.

6. A process for manufacture of sodium hydride which comprises mixing molten sodium with finely divided sodium hydride and about 0.1 to 1% by weight of stearic acid and subjecting the mixture to the action of hydrogen.

7. A process for manufacture of sodium hydride which comprises mixing a molten alkali metal with a finely divided solid material and a relatively small amount of a fatty acid compound selected from the group consisting of fatty acids having more than 8 carbon atoms and salts thereof and subjecting the mixture to the action of hydrogen with continuous agitation at a temperature between the melting point of said metal and about 600° C.

8. A process for manufacture of sodium hydride which comprises mixing molten sodium with finely divided sodium hydride and about 0.1 to 1% by weight of a fatty acid compound selected from the group consisting of fatty acids having more than 8 carbon atoms and salts thereof and subjecting the mixture to the action of hydrogen with continuous agitation at a temperature of about 200 to 450° C.

9. A process for manufacture of sodium hydride which comprises mixing molten sodium with finely divided sodium hydride and about 0.1 to 1% by weight of magnesium stearate and subjecting the mixture to the action of hydrogen with continuous agitation at a temperature of about 200 to 450° C.

10. A process for manufacture of sodium hydride which comprises mixing molten sodium with finely divided sodium hydride and about 0.1 to 1% by weight of a sodium salt of a fatty acid containing more than 8 carbon atoms and subjecting the mixture to the action of hydrogen with continuous agitation at a temperature of about 200 to 450° C.

VIRGIL L. HANSLEY.